United States Patent [19]
Liu et al.

[11] Patent Number: 5,623,632
[45] Date of Patent: Apr. 22, 1997

[54] SYSTEM AND METHOD FOR IMPROVING MULTILEVEL CACHE PERFORMANCE IN A MULTIPROCESSING SYSTEM

[75] Inventors: Peichun P. Liu; Michael J. Mayfield; Robert J. Reese, all of Austin, Tex.

[73] Assignee: International Business Machines Corporation, Armonk, N.Y.

[21] Appl. No.: 442,740

[22] Filed: May 17, 1995

[51] Int. Cl.$^6$ ................................................ G06F 12/08
[52] U.S. Cl. .................... 395/471; 395/469; 395/470; 395/472; 395/473; 395/449
[58] Field of Search .................................. 395/449, 468, 395/470, 471, 472, 473

[56] References Cited

U.S. PATENT DOCUMENTS

| | | | |
|---|---|---|---|
| 4,755,930 | 7/1988 | Wilson, Jr. et al. | 395/449 |
| 5,113,514 | 5/1992 | Albonesi et al. | 395/471 |
| 5,241,641 | 8/1993 | Iwasa et al. | 395/449 |
| 5,297,269 | 3/1994 | Donaldson et al. | 395/472 |
| 5,325,503 | 6/1994 | Stevens et al. | 395/473 |
| 5,369,753 | 11/1994 | Tipley | 395/449 |
| 5,394,555 | 2/1995 | Hunter et al. | 395/800 |
| 5,522,057 | 5/1996 | Lichy | 395/471 |
| 5,524,233 | 6/1996 | Milburn et al. | 395/468 |
| 5,526,510 | 6/1996 | Akkary et al. | 395/460 |

OTHER PUBLICATIONS

Seong T. Zhang and Chu S. Jhon, "A New Write–Invalidate. Snooping Cache Coherence Protocol for Split Transaction Bus–Based Multiprocessor Systems", '93, IEEE Tencon '93/Beijing, pp. 229–232.

C. Anderson and J. Baer, "A Multi-Level Hierarchical Cache Coherence Protocol for Multiprocessors", 93, Parallel Processing Symposium, pp. 142–148.

Milo Tomasevic and Veliko Milutinovic, "A Survey of Hardware Solutions for Maintenance of Cache Coherence in Shared Memory Multiprocessors", 93, System Sciences, 93 Annual Hawaii Int'l Conferences, pp. 863–872.

*Primary Examiner*—Eddie P. Chan
*Assistant Examiner*—Hong C. Kim
*Attorney, Agent, or Firm*—Kelly K. Kordzik; Winstead Sechrest & Minick P.C.; Anthony V. S. England

[57] ABSTRACT

In a multiprocessor system having a plurality of bus devices coupled to a storage device via a bus, wherein the plurality of bus devices have a snoop capability, and wherein the plurality of bus devices have first and second caches, and wherein the plurality of bus devices utilize a modified MESI data coherency protocol, the system provides for reading of a data portion from the storage device into one of the plurality of bus devices, wherein the first cache associated with the one of the plurality of bus devices associates a special exclusive state with the data portion, and wherein the second cache associated with the one of the plurality of bus devices associates an exclusive state with the data portion, initiating, by the one of the plurality of bus devices, a write-back operation with respect to the data portion, determining if there are any pending snoops in the second cache, and changing the special exclusive state to a modified state if there are no pending snoops in the second cache. If there is a pending snoop in the second cache, a comparing of addresses of the pending snoop and the data portion is performed. The special exclusive state is changed to a modified state if the addresses are different. The special exclusive state indicates that a data portion is held in the primary cache in a shared state and that the data portion is held in the secondary in an exclusive state.

16 Claims, 3 Drawing Sheets

SYSTEM AND METHOD FOR IMPROVING MULTILEVEL CACHE PERFORMANCE IN A MULTIPROCESSING SYSTEM

TECHNICAL FIELD OF THE INVENTION

The present invention relates in general to data processing systems, and, in particular, to a system and method for providing flow control and coherency information within a multiprocessor system.

BACKGROUND OF THE INVENTION

In a multiprocessor system utilizing shared memory, cache protocols are required to insure data consistency, however, to the overall system, the presence of caches should be transparent. Various protocols are implemented within such systems, including write-through actions (stores are written to the cache and to storage at the same time) and write-back actions (stores are written to the cache and only written to storage when the line in the cache needs to be displaced for a more recent requester or when another processor requires the cached line).

In a write-back protocol, writes may be made to the cache exclusively. These lines must then be marked as changed or modified so that the cache control logic will know whether to write the line back to system memory or to discard it. The modified state is marked by an M bit which improves performance since unmodified lines need not be written back to system memory. A well-known protocol (MESI) is often utilized where there is an M bit as discussed previously, an Exclusive (E) bit indicating that the line only exists in this cache, a Shared (S) bit indicating the line can be shared by multiple users at one time, and an Invalid (I) bit indicating the line is not available in the cache.

In certain systems, two or more serial caches may be utilized. For example, there may be a Level 1 (L1) cache associated with each processor (implemented as a write-through cache). The L1 cache is small so as to fit on the same chip as the processor to optimize access time performance. Off of the processor chip may be a larger and slower Level 2 (L2) cache, which is faster than the main system memory storage. This L2 cache is implemented as a write-back cache, and may contain a super-set of the data in the L1 cache. The L2 cache is generally much larger than the L1 cache; each cache holds the set of lines that have been most recently accessed by the associated processor, the set for each cache being proportional to its size.

The L2 and L1 caches utilize the MESI protocol such that for each cache line, there is an M, E, S, or I state that indicates the current state of the cache line in the system. The L1 cache does not require the Exclusive bit in systems where it is the L2 cache's responsibility to manage line MESI state changes. In these systems, a line marked Exclusive in L2, would be marked Shared in L1. If another processor wants to share a copy of this line, the L2 would indicate via its snoop response that the line is Shared, and change the state of the L2 copy of the line to Shared. Since the L1 line state did not need to be changed, the L1 cache did not need to be involved in the line state change, improving performance.

In systems employing "snoopy" bus devices, each of the bus devices coupled to the shared bus will monitor an operation, such as a read operation, to determine whether or not a more recent (often modified) copy of the requested data is contained within that bus device's cache, thus making that modified copy of the requested data the most recent version. This is often referred to as coherency checking, wherein the system insures that the most recent and valid version of requested data is sent to the requesting device, regardless of whether or not the memory system or one of the bus devices currently holds a copy of the most recent version.

In a multiprocessor environment, snoop latency may be fixed, which means that when a processor makes a storage request on the system bus, all other processors, or bus devices, must respond within a fixed period of time. In the event the storage request is a line read, other processors or devices which have a copy of the line are allowed to respond only with Shared or Modified. (A processor is not allowed to keep exclusive ownership of the line in this case.) If the snoop response is Modified, the processor owning the current state of the line must provide the current copy to the requestor, and change the state of its copy of the line to Shared or Invalid, depending on the "snoopy" bus protocol. In systems where the L1 cache cannot be snooped, or the L1 cache snoop response cannot meet the fixed response time requirement of the "snoopy" bus, the L2 cache must mark a line as Modified prior to any processor store to that line.

The problem with this approach is that there is latency introduced in the case where a processor decides to do a store to a cache line that is exclusive in its L2 cache. Normally, the processor would be required to request that the L2 cache initiate a state change to Modified for the cache line prior to storing the data. This may require several cycles since the MESI state for each line is in a relatively slow cache tag array. In order to change the MESI state, the L2 cache has to be read to determine its state and then updated to reflect the Modified state. In addition, the operation is generally pipelined, which adds to the latency. As a result of the foregoing, there is a need in the art for an improvement in the performance of cache coherency within a multiprocessor system.

SUMMARY OF THE INVENTION

The aforementioned need is satisfied by the present invention, which implements a unique protocol between L1 and L2 caches associated with a processor in a multiprocessor system, wherein snoop capabilities are present.

The present invention may be implemented in a multiprocessor data processing system comprising a plurality of processors, or other bus devices such as input/output devices. Each bus device has associated therewith an L1 cache and an L2 cache. Each bus device is coupled to a common system memory through a system bus and a memory controller.

The L2 cache controller utilizes a MESI protocol, while the L1 controller utilizes a modified version of the MESI protocol, wherein the Exclusive state is replaced with a Special Exclusive (P) state. This P state indicates to the L1 cache that the L1 cache holds the cache line in a Shared state and that the line is in an Exclusive state in the L2 cache.

An operation of the present invention may be initiated as follows. One of the processors may retrieve a data portion from system memory. The L2 cache associated with the processor will store the cache line and set a bit in the L2 cache indicating that the retrieved cache line is in an Exclusive state. The L1 cache will also store the cache line and set the Special Exclusive state with respect to the retrieved cache line. Thereafter, when the processor attempts to write to the line marked "Special Exclusive", the L1 cache will initiate a request to the L2 cache to change the line state to "Modified" (a Data Cache line claim request, or DCLAIM) along with the information that the line is marked "Special Exclusive." In one embodiment of the present invention, a determination is made in the L2 cache controller whether or not any snoop operations are pending in the L2 cache. If not, the DCLAIM request will be approved and the L1 and L2 caches will set a Modified state for the modified cache line. However, if there are snoops pending in the L2 cache, a comparison will be made between the address bits associated with the one or more snoop operations received by the L2 cache controller and the address of the modified cache line. If none of the addresses are the same, then the DCLAIM request is approved and the Modified state bit set within the L1 and L2 caches for the modified cache line. However, if a snoop operation within the L2 cache controller does match with the address of the modified cache line, the DCLAIM request is rejected and the L1 cache is then required to gain ownership of the cache line through other means.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION OF A PREFERRED EMBODIMENT OF THE INVENTION

Figure 1:
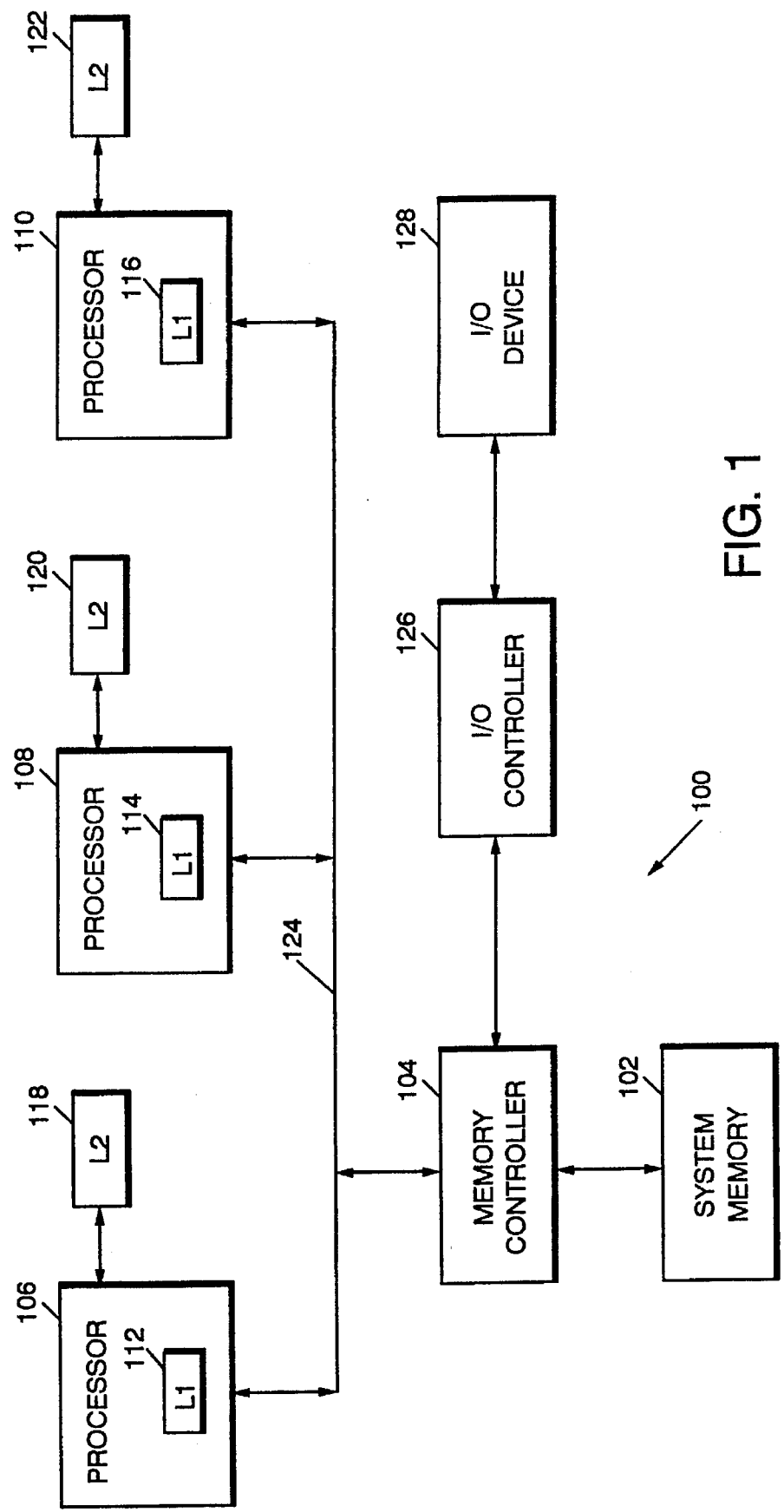
FIG. 1 illustrates a multiprocessor system operable for implementing the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring now to FIG. 1, a data processing system which advantageously embodies the present invention will be described. Multiprocessor system 100 includes a number of processing units 106, 108, 110 operatively connected to system bus 124. Note that any number of processing units may be utilized within system 100. Also connected to system bus 124 is memory controller 104, which controls access to system memory 102. Memory controller 104 is also coupled to I/O controller 126, which is coupled to I/O device 128. Processing units 106, 108, 110, I/O controller 126, and I/O device 128 may all be referred to as bus devices herein. As shown, each processor unit 106, 108, 110 may include a processor and L1 caches 112, 114, 116, respectively. The L1 caches may be located on the same chip as the respective processor. Coupled to processing units 106, 108, 110 are L2 caches 118, 120, 122, respectively. These L2 caches are connected to the system bus 124 via the processor to which it is attached.

As described above, each L1 and L2 cache pair are serially related. Each L1 cache is implemented as a write-through cache, while the larger and slower L2 cache is implemented as a write-back cache. Both the L1 and L2 cache controllers are physically implemented as part of the processing unit, and are connected via busses internal to the processing unit. The L2 controller could be off chip, and the invention would still apply.

Figure 2:
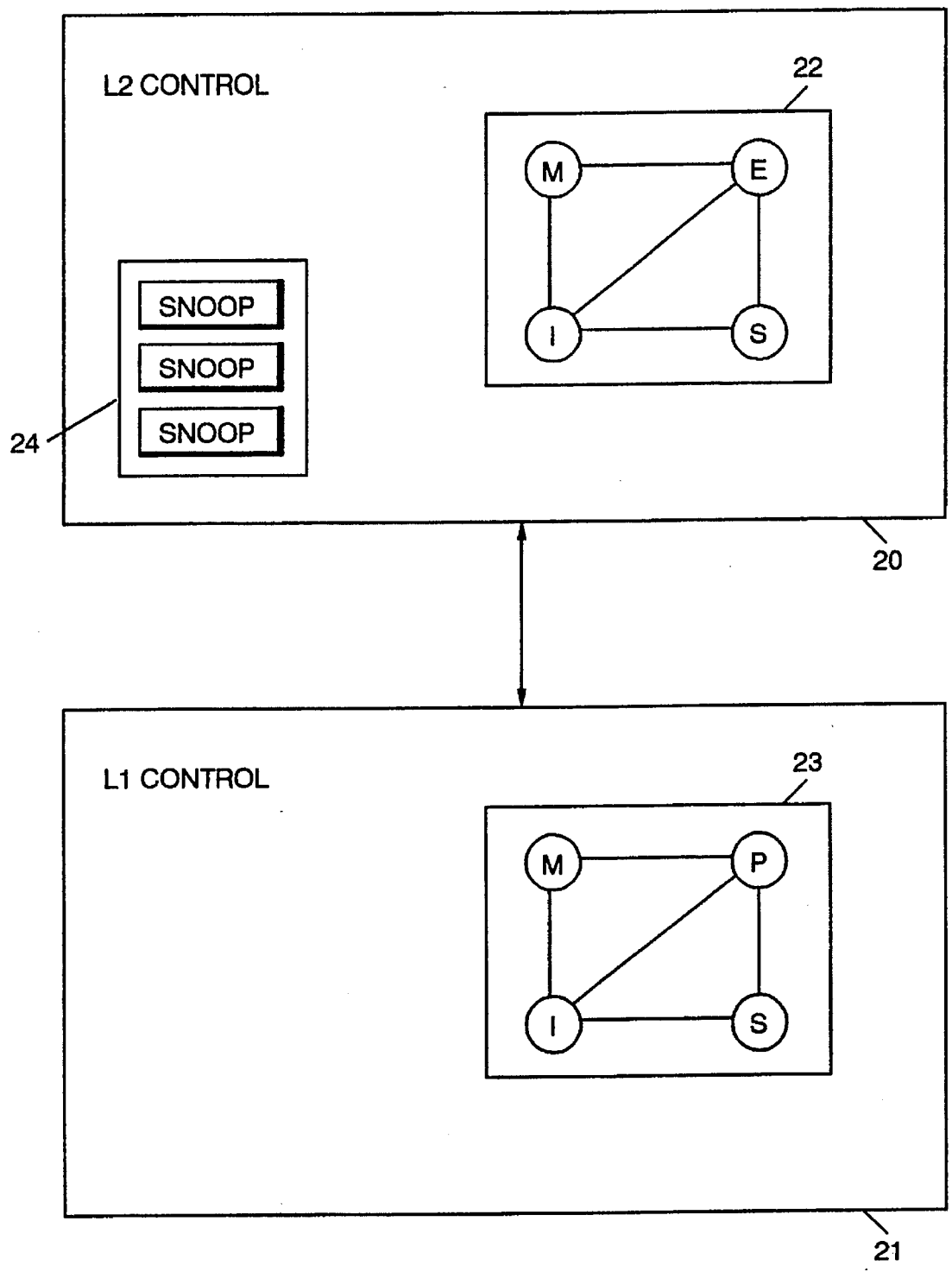
FIG. 2 illustrates L1 and L2 cache controllers.

Referring to FIG. 2, there is illustrated controller 20 for any of L2 caches 118, 120, 122 and L1 cache controller 21 for any of L1 caches 112, 114, 116. L2 cache controller 20 utilizes a MESI state protocol 22, while L1 cache controller 21 utilizes a modified version 23 of the MESI state protocol. Both the L1 and L2 cache controllers store line MESI state information in the respective cache directory line entries. L2 cache controller 20 utilizes a standard four state MESI protocol, as described earlier. L1 cache controller 21 also implements the standard meaning for the MSI states. The "Exclusive" or "Special Exclusive" state is treated by the L1 cache the same as the "Shared" state, but this state information is used by the L2 cache controller 20 to improve performance on L1 DCLAIM requests.

Furthermore, L2 cache controller 20 contains snoop pending address registers 24 for containing received snoops from other bus devices. Snooping is well-known in the art and need not be described herein.

Within L1 cache controller 21, a Special Exclusive state (P) is implemented, which indicates that the associated L1 cache holds a cache line in a Shared state, but that the line is in an Exclusive state in the associated L2 cache. This Special Exclusive state essentially indicates that an operation initiated by the processor requiring a store operation will probably be granted an L1 request for a Modified state. This is because the cache line is held in an Exclusive state in the L2 cache; in other words, a store will be permitted unless delayed by a pending snoop from another bus device.

Within the prior art, if a processor would want to store a line in its associated L1 cache, wherein the line is marked as Shared, the processor would first have to request a change of state of the cache line to a Modified state from the L2 cache. This operation is known as a DCLAIM request. The DCLAIM request is sent to the L2 cache controller, which will interrogate its associated directory and change the Exclusive state to a Modified state. The response to the DCLAIM request will acknowledge ownership of the line to the L1 cache, which will also set its state to Modified. If the line is not available for the L1 cache's ownership (due to a snoop for instance), the DCLAIM request will be rejected and the L1 cache will have to regain ownership of the line before permitting the store operation to complete.

In the present invention, the implemented Special Exclusive state allows a significant performance advantage since the DCLAIM operation does not need to check the L2 cache MESI state in the slow directory interrogation procedure mentioned above with respect to the prior art. Instead, the DCLAIM request only needs to assure itself that there are not any pending snoops to the cache line in the L2 cache.

Figure 3:
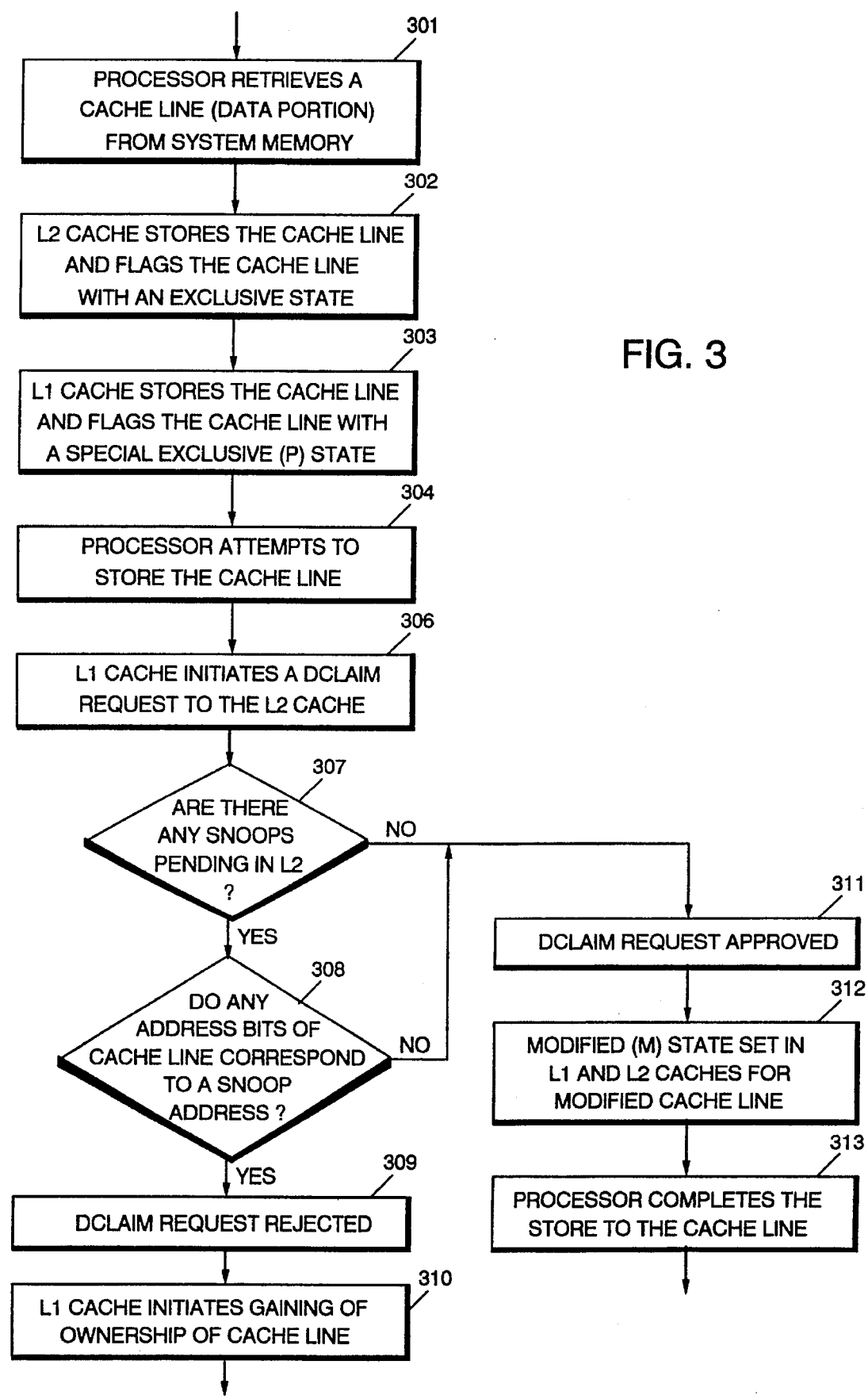
FIG. 3 illustrates a flow diagram of the present invention.

Referring to FIG. 3, there is illustrated a flow diagram illustrating an implementation of the present invention. The flow diagram in FIG. 3 may be a portion of an overall data coherency flow operating within system 100. In step 301, processor 106 may retrieve a portion of data, i.e., a cache line, from system memory 102 through memory controller 104 and system bus 124. Thereafter, in step 302, L2 cache 118 will store the cache line and associate with the cache line an Exclusive state bit. This Exclusive state bit is set since processor 106 is the sole owner of the requested cache line.

In step 303, L1 cache 112 will also store the cache line and will set the Special Exclusive (P) state bit along with the stored cache line.

Thereafter, processor 106 may attempt to store to this cache line (step 304). In response, in step 306, L1 cache 112 will initiate a DCLAIM request to L2 cache 118. In step 307, L2 controller logic 20 will determine whether there are any snoop operations pending in register 24 of L2 cache controller 20. If there are no pending snoops, the process will proceed to step 311 to approve the DCLAIM request. However, if there are pending snoops, then the process will move to step 308 to compare the address bits associated with any one of the one or more snoop operations stored in register 24 with the address of the modified cache line. If any address of a snoop matches the address of the modified cache line, the process proceeds to step 309 to reject the DCLAIM request. Thereafter, in step 310, the L1 cache is then required to regain ownership of the cache line before it is permitted to complete the store operation.

If in step 308, it is determined that the cache line address does not compare to any of the snoop addresses, the process will proceed to step 311 wherein the DCLAIM request is approved. Thereafter, in step 312, a Modified state bit is set in both the L1 and L2 caches with respect to the modified cache line. At this point, the processor may complete the store to the cache line (step 313).

Please note that in the above procedure, it is not necessary to implement step 307. Thus, optionally, merely step 308 may be implemented after step 306.

With the foregoing hardware in mind, it is possible to explain the process-related features of the present invention. To more clearly describe these features of the present invention, discussion of other conventional features is omitted as being apparent to those skilled in the art. It is assumed that those skilled in the art are familiar with a multiuser, multiprocessor operating system, and in particular with the requirements of such an operating system for memory management including virtual memory, processor scheduling, synchronization facilities for both processes and processors, message passing, ordinary device drivers, terminal and network support, system initialization, interrupt management, system call facilities, and administrative facilities.

Although the present invention and its advantages have been described in detail, it should be understood that various changes, substitutions and alterations can be made herein without departing from the spirit and scope of the invention as defined by the appended claims.

What is claimed is:

1. In a multiprocessor system comprising a plurality of bus devices coupled to a storage device via a bus, wherein said plurality of bus devices have a snoop capability, wherein said plurality of bus device have primary and secondary caches, and wherein said plurality of bus devices utilize a modified MESI data coherency protocol, a method comprising the steps of:

reading a data portion from said storage device into one of said plurality of bus devices, wherein said primary cache associated with said one of said plurality of bus devices associates a special exclusive state with said data portion, and wherein said secondary cache associated with said one of said plurality of bus devices associates an exclusive state with said data portion;

initiating, by said one of said plurality of bus devices, a write-back operation with respect to said data portion;

determining if there are any pending snoop requests in said secondary cache; and changeing said special exclusive state to a modified state in said primary cache if there are no said pending snoop requests in said secondary cache, wherein said special exclusive state indicates that said data portion is held in said primary cache in a shared state and indicates said data portion is held in said secondary cache in an exclusive state.

2. The method as recited in claim 1, further comprising the steps of:

if there is a pending snoop request in said secondary cache, comparing addresses of said pending snoop request and said data portion; and changing said special exclusive state to said modified state in said primary cache if said addresses are different.

3. The method as recited in claim 1, further comprising the step of:

changing said exclusive state associated with said secondary cache to said modified state.

4. The method as recited in claim 1, further comprising the step of:

modifying, by said one of said plurality of bus devices, said data portion prior to said write-back operation.

5. The method as recited in claim 1, further comprising the step of:

initiating a DCLAIM request from said primary cache to said secondary cache in response to said step of initiating, by said one of said plurality of bus devices, said write-back operation with respect to said data portion.

6. The method as recited in claim 5, wherein said changing step further comprises the step of approving said DCLAIM request.

7. The method as recited in claim 5, further comprising the steps of:

rejecting said DCLAIM request if an address of said pending snoop request matches an address of said data portion; and initiating, by said primary cache, a gaining of ownership of said data portion.

8. The method as recited in claim 1, wherein said special exclusive state indicates to said secondary cache that said secondary cache does not need to make a determination whether the data portion is held in said secondary cache in said exclusive state.

9. A multiprocessor system comprising:

system memory;

a memory controller coupled to said system memory;

a plurality of processors;

a system bus coupling said plurality of processors to said memory controller;

primary and secondary caches associated with one of said plurality of processors, wherein said secondary cache implements a MESI protocol, and wherein said primary cache implements a modified MESI protocol comprising a special exclusive state;

means for initiating, by said one of said plurality of processors, a write-back operation with respect to a data portion;

cache control logic circuitry for determining if there are any pending snoop requests in said secondary cache; and cache control logic circuitry for changing said special exclusive state in said primary cache to a modified state if there are no said pending loop requests in said secondary cache, wherein said special exclusive state indicates that said data portion is held in said primary cache in a shared state and that said data portion is held in said secondary cache in an exclusive state.

10. The system as recited in claim 9, further comprising:

cache control logic circuitry for comparing addresses of said pending snoop requests and said data portion if there is a pending snoop request in said secondary cache; and cache control logic circuitry for changing said special exclusive state to a modified state in said primary cache if said addresses are different.

11. The system as recited in claim 10, further comprising:

cache control logic circuitry for initiating a DCLAIM request from said primary cache to said secondary cache in response to said step of initiating, by said one of said plurality of processors, a write-back operation with respect to said data portion.

12. The system as recited in claim 9, further comprising:

cache control logic circuitry for changing said exclusive state associated with said secondary cache to a modified state.

13. The system as recited in claim 9, further comprising:

means for modifying, by said one of said plurality of processors, said data portion prior to said write-back operation.

14. The system as recited in claim 9, further comprising:

cache control logic circuitry for rejecting said DCLAIM request if an address of said pending snoop request matches an address of said data portion; and means for initiating, by said primary cache, a gaining of ownership of said data portion.

15. The system as recited in claim 9, wherein said special exclusive state indicates to said secondary cache that said secondary cache does not need to make a determination whether the data portion is held in said secondary cache in an exclusive state.

16. A multiprocessor system comprising:

system memory;

a memory controller coupled to said system memory;

a plurality of processors;

a system bus coupling said plurality of processors to said memory controller;

first and second caches associated with one of said plurality of processors, wherein said first cache is a write-through cache and said second cache is a write-back cache, wherein said second cache implements a MESI protocol, and wherein said first cache implements a modified MESI protocol comprising a special exclusive state;

means for initiating, by said one of said plurality of processors, a write-back operation with respect to a data portion;

cache control logic circuitry for determining if there are any pending snoop requests in said second cache; and cache control logic circuitry for changing said special exclusive state in said first cache to a modified state if there are no said pending snoop requests in said second cache, wherein said special exclusive state indicates that data said portion is held in said first cache in a shared state and that said data portion is held in said second cache in an exclusive state.

* * * * *

UNITED STATES PATENT AND TRADEMARK OFFICE
CERTIFICATE OF CORRECTION

PATENT NO. : 5,623,632
DATED : April 22, 1997
INVENTOR(S) : Liu, et al

It is certified that error appears in the above-identified patent and that said Letters Patent is hereby corrected as shown below:

Column 5, line 62: Replace "wherein said plurality of bus device" with -- wherein said plurality of bus devices --.

Column 6, line 10: Replace "changing" with -- changing --.

Column 7, line 9: Replace "if there are no said pending loop" with -- if there are no said pending snoop --

Signed and Sealed this

Sixteenth Day of March, 1999

Attest:

Q. TODD DICKINSON

Attesting Officer

Acting Commissioner of Patents and Trademarks